(12) United States Patent
Fulsang

(10) Patent No.: US 6,470,935 B1
(45) Date of Patent: Oct. 29, 2002

(54) TIRE HAVING INSIDE WALLS

(75) Inventor: Eric J. Fulsang, Seattle, WA (US)

(73) Assignee: Fulsang Architecture Inc., Seattle, WA (US)

( * ) Notice: Subject to any disclaimer, the term of this patent is extended or adjusted under 35 U.S.C. 154(b) by 0 days.

(21) Appl. No.: 09/563,101

(22) Filed: May 2, 2000

(51) Int. Cl.⁷ ................................. B60C 5/22
(52) U.S. Cl. ..................... 152/339.1; 152/331.1; 152/342.1; 152/329
(58) Field of Search ............. 152/331.1, 336.1, 152/339.1, 340.1, 310, 311, 323, 324, 325, 329

(56) References Cited

U.S. PATENT DOCUMENTS

| | | | |
|---|---|---|---|
| 468,971 A | * | 2/1892 | Myers .................. 152/325 |
| 601,211 A | * | 3/1898 | Mears ................. 152/340.1 |
| 989,431 A | | 4/1911 | Scaramuzzi |
| 1,053,238 A | * | 2/1913 | Stewart ................ 152/166 |
| 1,325,233 A | | 12/1919 | Cooper |
| 1,413,078 A | | 4/1922 | Von Edelkrantz |
| 2,108,406 A | * | 2/1938 | Kraft ................... 152/329 |
| 2,196,814 A | | 4/1940 | McClay |
| 2,217,122 A | * | 10/1940 | Lowry ................. 152/167 |
| 2,990,869 A | | 7/1961 | Riley |
| 3,097,680 A | | 7/1963 | Willis |
| 3,901,750 A | | 8/1975 | Bezbatchenko et al. |
| 3,913,981 A | | 10/1975 | Hunden |
| 3,941,176 A | | 3/1976 | Schwartz |
| 3,942,572 A | | 3/1976 | Crandall |
| 3,994,329 A | | 11/1976 | Masson et al. |
| RE30,030 E | | 6/1979 | Coran et al. |
| 4,280,546 A | * | 7/1981 | Mistretta ............. 152/516 |
| 4,909,295 A | | 3/1990 | Nirei et al. |
| 5,046,541 A | | 9/1991 | Bonko |
| 5,109,905 A | | 5/1992 | Lambe |
| 5,168,910 A | | 12/1992 | Zhang et al. |
| 5,301,729 A | | 4/1994 | Blair |
| 5,479,976 A | | 1/1996 | Cho |
| 5,535,800 A | | 7/1996 | Abbott |
| 5,568,830 A | | 10/1996 | Polsinelli et al. |
| 5,795,414 A | | 8/1998 | Shih |
| 5,849,118 A | | 12/1998 | Matsumoto |
| 5,871,600 A | | 2/1999 | Oare et al. |

* cited by examiner

Primary Examiner—Michael W. Ball
Assistant Examiner—Justin Fischer

(57) ABSTRACT

The present invention discloses a tire for a conventional rim, having two exterior sidewalls and two interior walls, and an annular tread portion with a center, an interior and an exterior surface. The first and second sidewalls extend radially from the tread portion. Each sidewall has a perimeter edge which is sized and configured to be coupled to a wheel hub. The first and second interior walls extend from substantially near the perimeter edge of the first and second sidewalls, respectively, to a predetermined location on the interior surface of the tread portion. The first and second interior walls being attached to the tread portion to transfer loads applied to the tire by alternatively flexing and compressing in response to the loads applied to the tire.

4 Claims, 3 Drawing Sheets

TIRE HAVING INSIDE WALLS

FIELD OF THE INVENTION

This invention pertains to motor vehicle tires, and more particularly to a tire having interlocking interior sidewalls.

BACKGROUND OF THE INVENTION

Conventional pneumatic tires are generally of a tubeless construction. A single puncture or hole in the outer sidewall or the tread will cause the tire to deflate, leaving the hapless driver to either change the tire if a spare is available, or refrain from using the automobile for risk of damaging the tire rim. Conventional tires typically have two exterior sidewalls without internal structural bracing. Such a tire is susceptible to lateral deformation due to high lateral loads associated with cornering too fast. This may lead to a blowout, thereby posing a safety risk, or reducing the life of the tire due to premature wear.

Prior solutions to the above-identified problems include the addition of an additional tire to the vehicle to increase the load carrying capacity of the tire, or increase the tire tread contact area with the surface for more stability. Although such solutions are effective at increasing vehicle load capacity and stability, they are not without their problems. First, adding at least one additional tire to a vehicle increases both the complexity and, therefore, the cost of the vehicle. Second, wider tire tread area may require a non-standard sized wheel hub and, therefore, is more expensive than a vehicle having a conventional sized wheel. Finally, such solutions may or may not increase the resistance of the sidewalls to lateral loads.

Therefore, there exists a need for a tire having increased load capacity, tread area and structural integrity to resist deformation, wherein such a tire is both cost effective and sized to fit conventional wheel hubs.

SUMMARY OF THE INVENTION

The present invention discloses a tire for a conventional rim, having two exterior sidewalls and two interior walls, and an annular tread portion with a center, an interior and an exterior surface. The first and second sidewalls extend radially from the tread portion. Each sidewall has a perimeter edge which is sized and configured to be coupled to a wheel hub. The first and second interior walls extend from substantially near the perimeter edge of the first and second sidewalls, respectively, to a predetermined location on the interior surface of the tread portion. The first and second interior walls being attached to the tread portion to transfer loads applied to the tire by alternatively flexing and compressing in response to the loads applied to the tire.

In a preferred embodiment, the tire has an annular tread portion having a center, an interior surface and an exterior surface. The tread portion has a first and a second region defined on the exterior surface of the tread portion forming a groove between the first and the second regions. The tire also includes a first and second sidewall extending radially from the tread portion, each of the sidewalls having a perimeter edge defining part of a bead portion. The tire also includes a first and a second interior wall. The first and second interior wall form a first and second bead, each bead is sized and configured to be coupled to a wheel hub. The first and second interior wall further include concave and convex regions extending on the wall therethrough to react to loads applied to the tire. The first and second interior wall extend diagonally from each of the respective beads to a predetermined location on the interior surface of the tread portion where each interior wall is attached to a region opposite.

In another embodiment, the tire may also include a traction ring embedded with studs, wherein the traction ring is sized and configured to be selectively attached between a groove separating the two tread regions.

In yet another embodiment, the tire has one annular tread portion with an interior and an exterior surface, a first and second sidewall extending radially from the tread portion, each sidewall having a perimeter edge forming part of a bead portion, sized and configured to be selectively coupled to a wheel hub, and a first and second interior wall, the first and second interior walls having varying radii of curvature forming concave and convex regions, the first and second interior walls forming a part of each of the respective beads. The first and second interior walls intersect one another above the tread portion forming at least three interior chambers. The first and second interior walls extend along a diagonal from the bead to the corresponding diagonal corner at the tread portion, where they are attached to the interior surface of the tread portion.

In still yet another embodiment, the tire has one annular tread portion, a first and second sidewall extending radially from the tread portion, each sidewall having a perimeter edge forming a part of a bead portion, sized and configured to be selectively coupled to a wheel hub, and a first and second interior wall, the first and second interior wall being joined at a center region of the tread portion. The first and second interior walls having varying radii of curvature forming concave and convex regions. The first and second interior walls forming a part of each of the respective beads. The first and second walls generally follow a diagonal from each respective bead to the center region of the tread portion.

BRIEF DESCRIPTION OF THE DRAWINGS

The foregoing aspects and many of the attendant advantages of this invention will become better understood by reference to the following detailed description, when taken in conjunction with the accompanying drawings, wherein.

DETAILED DESCRIPTION OF THE PREFERRED EMBODIMENT

Figure 1:
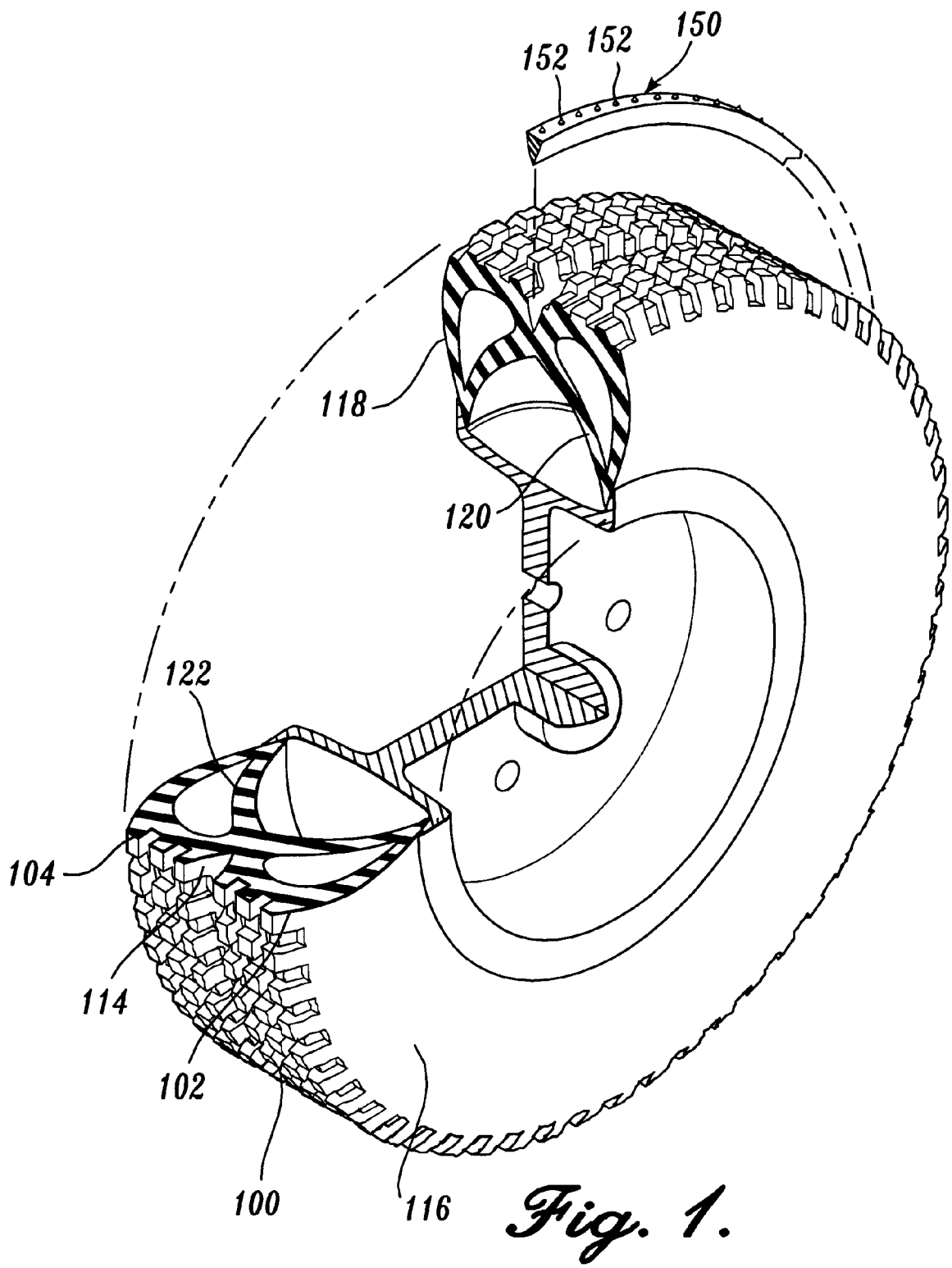
FIG. 1 shows a cross sectional view of one embodiment of a tire for a vehicle constructed in accordance with the present invention.
Figure 2:
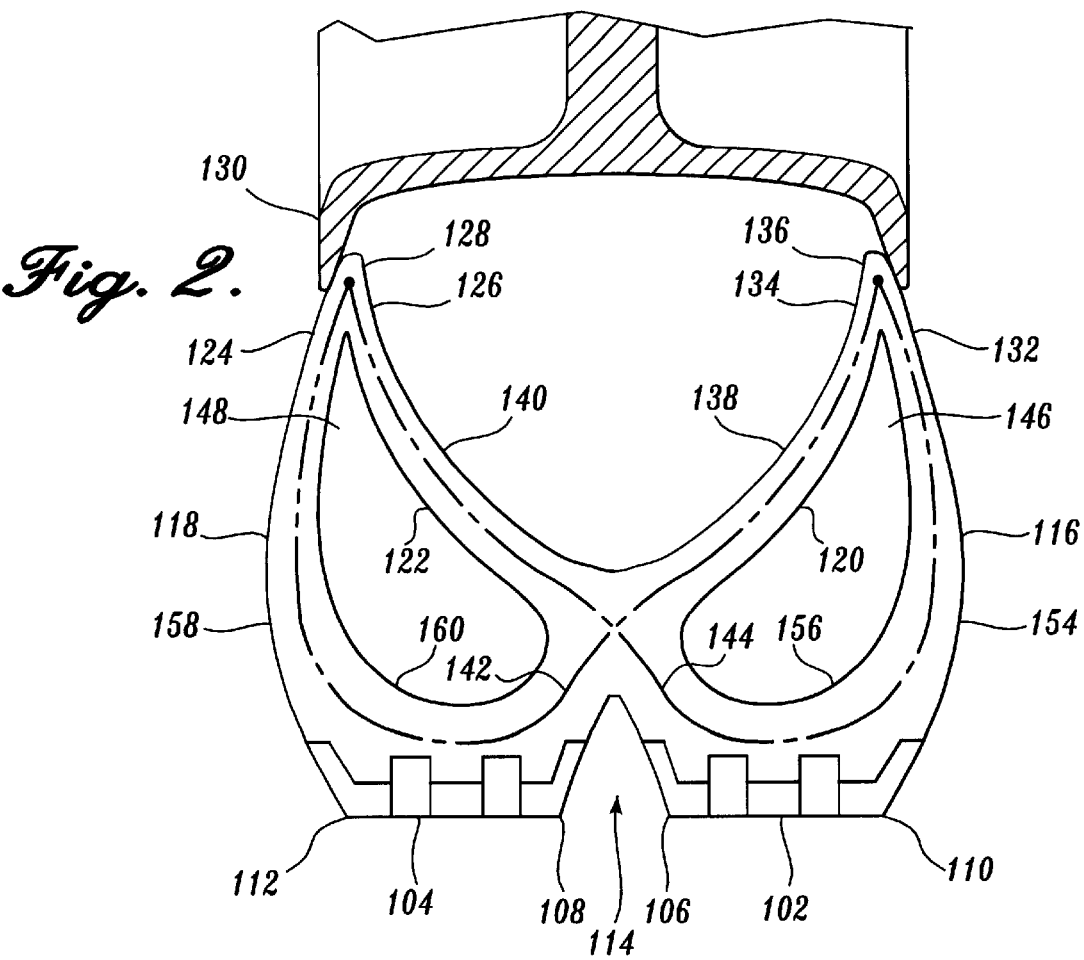
FIG. 2 shows the tire of FIG. 1 with a portion of the tire cutaway for clarity and a traction ring disposed around the perimeter of the tire.

FIGS. 1 and 2 show one embodiment of a tire constructed in accordance with the present invention. The tire includes an annular tread portion 100 having a lateral tread region 102 and a medial tread region 104. The portion of the tread 100 which contacts the ground surface may be provided in any of a number of configurations for this and all embodiments constructed in accordance with the present invention.

The lateral 102 and medial 104 tread regions each include an inside 106, 108 and an outside 110, 112 region, respectively. The tread portion 100 is divided by a groove 114. It should be noted that the terms "lateral" and "medial" are intended to be descriptive and not for purposes of limiting the invention. Thus, it should be understood that although the invention is described as having lateral and medial tread regions, other embodiments, such as a tire having more or less tread regions, are also within the scope of the present invention.

The tire also has a lateral exterior sidewall 116, a medial exterior sidewall 118 opposite of the exterior sidewall 116, a lateral interior sidewall 120, and a medial interior sidewall 122. The upper portion 124 of the medial exterior sidewall 118 and the upper portion 126 of the medial interior sidewall 122 define a medial bead 128, sized and configured to be selectively coupled to a conventional rim 130. Similarly, the upper portion 132 of the lateral exterior sidewall 116 and the upper portion 134 of the lateral interior sidewall 120 define a lateral bead 136, sized and configured to be selectively coupled to a conventional rim 130. A tire constructed in accordance with the present invention may be applied to rims of all sizes and configurations. Lateral exterior sidewall 116 and medial exterior sidewall 118 extend radially from each of the respective beads 136 and 128 to connect to the tread portion 100, where a lower portion 154 of the lateral exterior sidewall 116 is connected to a lateral corner 156 of the tread portion 100 and a lower portion 158 of the medial exterior sidewall 118 is connected to a medial corner 160 of the tread portion 100.

The lateral interior sidewall 120 generally extends diagonally from the lateral bead 136 to the respective opposite inside region 108 of the medial tread region 104 where it is attached thereto. The medial interior sidewall 122 generally also extends diagonally from the medial bead 128 to the respective opposite inside region 106 of the lateral tread region 102 where it is attached thereto. The interior sidewalls are configured to form two intersecting "S" patterns. The interior sidewalls 120, 122 have varying radii of curvature defining concave 138, 140 and convex 142, 144 regions, defining portions of conic shapes, in particular those regions may be said to be parabolic. These regions may be selectively designed to determine the path of flexing when loads are applied to the tire. The interior sidewalls 120, 122 define a first 146 and second 148 chamber with the exterior sidewalls 116, 118 and the two tread regions 102, 104. The chambers 146, 148 defined by the exterior 116, 118 and interior 120, 122 sidewalls and tread regions 102, 104 may be filled with air, jelly, or rubber ball bearings or any other suitable compressible material. The chambers of any of the embodiments of the present invention may be filled with like materials. A tire constructed in accordance with the present invention may also include holes or voids within the first and second interior walls so that chambers are in communication with one another.

As seen best by referring to FIG. 1, the tire has a groove 114 defined by the lateral tread region 102 and the medial tread region 104. The groove 114 is adapted to receive a traction device 150 in the shape of a ring. The traction device 150 may be fitted with studs 152 or other traction members to increase traction on road surfaces. Suitable uses include ice, mud, sand, etc. A person of ordinary skill in the art would readily appreciate any of the multitude of stud-like members suitable for a traction device ring.

Figure 3:
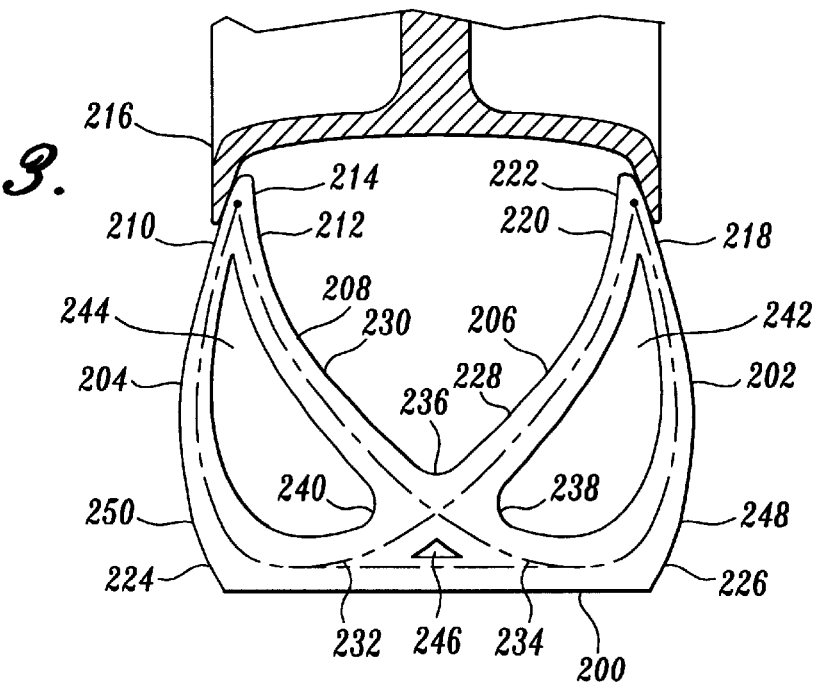
FIG. 3 shows a cross sectional view of an alternate embodiment of a tire constructed in accordance with the present invention.

Referring now to FIG. 3, a first alternate embodiment of a tire constructed in accordance with the present invention will now be described in greater detail. For purposes of illustration, only a cross sectional view of a tire constructed in accordance with the present invention is shown. It should be readily apparent that a tire is meant to have an annular shape. This embodiment is identical in materials and operation as the first embodiment described above with the exception that the current alternate embodiment includes an annular tread portion 200 with a single tread region. It should be readily apparent that the ground contact surface of the tread portion 200 may have any of a number of configurations. In this embodiment, the tire is constructed from a lateral exterior sidewall 202, a medial exterior sidewall 204 opposite the lateral exterior sidewall 202, a lateral interior sidewall 206, and a medial interior sidewall 208. The upper portion 210 of the medial exterior sidewall 204 and the upper portion 212 of the medial interior sidewall 208 define a medial bead 214, sized and configured to be selectively coupled to a conventional rim 216. The upper portion 218 of the lateral exterior sidewall 202 and the upper portion 220 of the lateral interior sidewall 206 define a lateral bead 222 to fit a conventional rim 216. A tire constructed in accordance with the present invention may be applied to rims of all sizes and configurations. Lateral exterior sidewall 202 and medial exterior sidewall 204 extend radially from each of the respective beads 222 and 214, to connect to the tread portion 200, where a lower portion 248 of the lateral exterior sidewall 202 is connected to a lateral corner 226 of the tread portion 200 and a lower portion 250 of the medial exterior sidewall 204 is connected to a medial corner 224 of the tread portion 200. The lateral interior sidewall 206 generally defines a diagonal from the lateral bead 222 to the respective opposite medial corner 224 of the tread portion 200 where it is attached thereto. The medial interior sidewall 208 generally defines a diagonal from the medial bead 214 to the respective opposite lateral corner 226 of the tread portion 200 where it is attached thereto. The interior sidewalls 206, 208 have varying radii of curvature defining concave 228, 230 and convex 232, 234 regions, defining portions of conic shapes, in particular, these regions may be said to be parabolic. The lateral interior sidewall 206 and the medial interior sidewall 208 intersect one another in an intersection region 236 proximate to the lower portions 238, 240 of each respective interior sidewall 206, 208 thereby forming three chambers 242, 244, and 246, with the exterior sidewalls 202, 204 and the tread portion 200.

Figure 4:
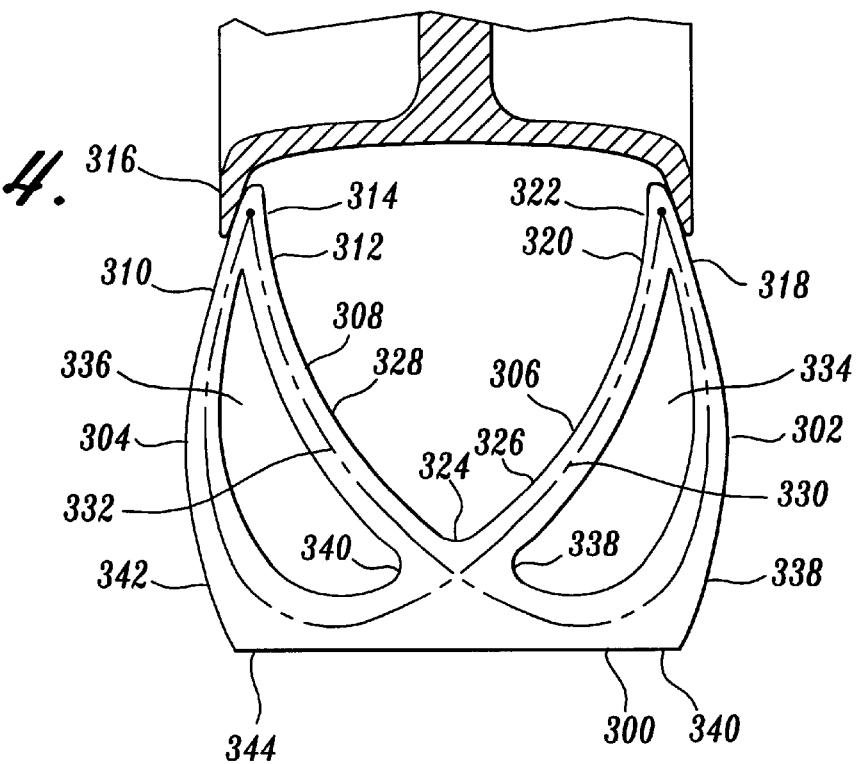
FIG. 4 shows a cross sectional view of a second alternate embodiment of a tire constructed in accordance with the present invention.

Referring now to FIG. 4, a second alternate embodiment of a tire constructed in accordance with the present invention will now be described in greater detail. This embodiment is identical in materials and operation as the first embodiment described above with the exception that the current alternate embodiment includes a tread portion 300 with a single tread region. It should be readily apparent that the ground contact surface of the tread portion 200 may have any of a number of configurations. In this embodiment, the tire is constructed from a lateral exterior sidewall 302, a medial exterior sidewall 304, a lateral interior sidewall 306, and a medial interior sidewall 308. The upper portion 310 of the medial exterior sidewall 304 and the upper portion 312 of the medial interior sidewall 308 define a medial bead 314 sized and configured to be selectively coupled to a conventional rim 316. The upper portion 318 of the lateral exterior sidewall 302 and the upper portion 320 of lateral interior sidewall 306 define a lateral bead 322 sized and configured to be selectively coupled to a conventional rim 316. A tire constructed in accordance with the present invention may be applied to rims of all sizes and configurations. Lateral exterior sidewall 302 and medial exterior sidewall 304 extend radially from each of the respective beads 322 and 314 to connect to the tread portion 300, where a lower portion 338 of the lateral exterior sidewall 302 is connected to a lateral corner 340 of the tread portion 300 and a lower portion 342 of the medial exterior sidewall 304 is connected to a medial corner 344 of the tread portion 300. The lateral interior sidewall 306 generally defining a diagonal from the lateral bead 322 to a center region 324 of the tread portion 300 where it is attached thereto. The medial interior sidewall 308 generally defining a diagonal from the medial bead 314 to the center region 324 of the tread portion 300 where it is attached thereto. The interior sidewalls 306, 308 have varying radii of curvature defining concave 326, 328 and convex 330, 332 regions, defining portions of conic shapes, in particular, these regions may be said to be parabolic. The interior sidewalls 306, 308 form a first 334 and second 336 chamber with the exterior sidewalls 302, 304 and the tread portion 300.

Those persons of ordinary skill can readily apply the tires of the present invention to the conventional art of tire-making.

Figure 5:
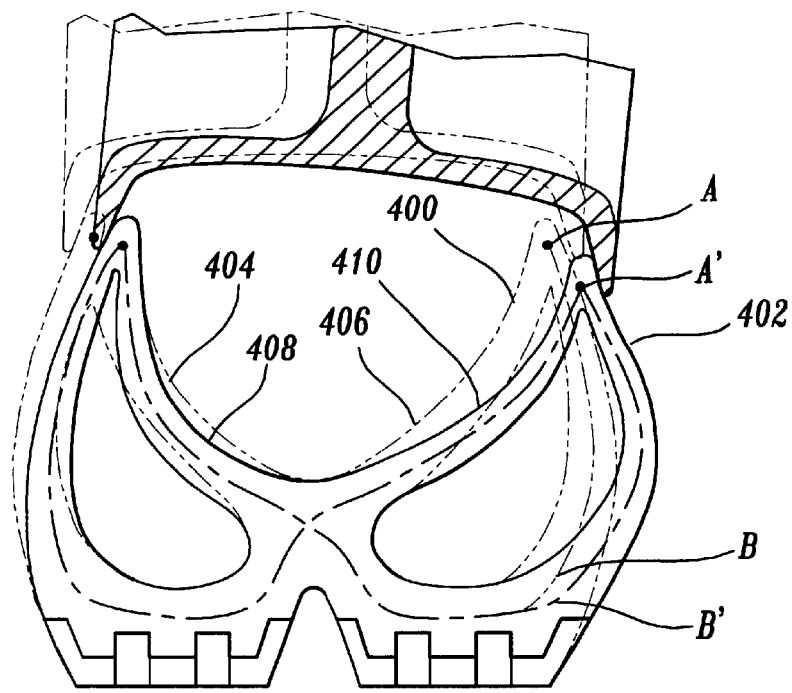
FIG. 5 shows a cross sectional view of the tire of FIG. 1 as it would deflect under certain loading conditions.

For illustration purposes, use of the tire will now be described with reference to FIG. 5. A tire constructed in accordance with the present invention is shown in phantom in a non-deflected state 400. Shown in bold is the same tire in a deflected state 402. A generic feature of all embodiments of a tire constructed in accordance with the present invention is the diagonally sloping interior sidewalls (404, 406 phantom) 408, 410 bold. The interior sidewalls generally have concave and convex predeflected regions. The shape of the interior sidewalls generally will define the load paths when the tire is under compressive or tensile loads. As the tire deforms, it is important to note that the interior sidewalls are predetermined to bend in the direction of concavity when placed under compressive loads as shown by interior sidewall 408, and the interior sidewalls may flatten out when placed under tensile loads as shown by interior sidewall 410. However, neither bending or flattening or any sort of deformation increases the length of the interior or exterior sidewalls. A distance measured from the bead to the tread portion along the centerline of any sidewall, exterior as well as interior, will remain substantially constant throughout any tire deflection. Thus, for example, distance A-B along the centerline in its non-deflected state remains substantially the same as in its deflected state A'-B'. This holds true for any two points on any centerline of the interior or exterior sidewalls. The concave and convex shape also imparts a deformable, spring-like action that snaps the tire back into shape when lateral forces are removed. The interior sidewalls also allow vertical forces, such as heavy loads from cargo carrying vehicles, to be transferred or channeled from the rim to the ground. Such vertical loads are transferred through the exterior sidewalls to the inside corner of the tire and through the interior sidewalls to the outside corner of the tire and vice versa. The combination of four sidewalls provides greater load bearing capacity and more effective corner traction between the vehicle and the ground.

When the tire is under static or moving vertical loads, the interior sidewalls brace the exterior sidewalls to resist deflection, thereby providing greater traction and stability.

In some embodiments, the tire is provided with a tread portion having two tread regions. It is generally known that wide tires provide more stable cornering. However, an advantage of the tire of the present invention is to widen the effective width of the tire while maintaining minimal surface area contact with the ground, thereby reducing rolling friction and improving fuel economy.

In addition, the tire of the present invention may have a plurality of chambers. Each chamber may have a separate fill nozzle. In this manner, deflation of one chamber will not deflate the entire tire, allowing the user to continue driving. Alternatively, the tire may have holes in the interior sidewalls to equalize the air pressure.

Materials of construction for a tire constructed in accordance with the present invention are similar for conventional tires. A person of ordinary skill in the art would readily know and comprehend all suitable materials to construct a tire in accordance with the present invention.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A tubeless, pneumatic tire for motor vehicles comprising:

(a) an annular tread portion having an interior and an exterior surface, wherein said annular tread portion contains a centrally disposed groove that defines a first and second tread region, each of said first and second tread region being associated with a first and second exterior sidewall, respectively;

(b) said first and second exterior sidewalls extending radially inward from said tread portion and capable of being coupled to a wheel hub;

(c) a first interior sidewall that is integral with said first exterior sidewall and extends diagonally from a radial position near said wheel hub to a radial position on the interior surface of the second tread region, thereby forming a first bead portion, wherein said first interior sidewall defines radially innermost concave regions and radially outermost convex regions;

(d) a second interior sidewall that is integral with said second exterior sidewall and extends diagonally from a radial position near said wheel hub to a radial position on the interior surface of the first tread region, thereby forming a second bead portion, wherein said second interior sidewall defines radially innermost concave regions and radially outermost convex regions;

(e) at least a first and second chamber defined by the first and second exterior sidewalls, first and second interior sidewalls, and the tread portion; and (f) an internal cavity defined by said first and second interior sidewalls which is capable of forming a chamber when mounted on a rim.

2. The tire according to claim 1, further comprising a traction device on said centrally disposed groove.

3. The tire according to claim 1, wherein said at least first and second chambers are filled with air, jelly, or rubber ball bearings.

4. The tire according to claim 1, wherein said at least first and second chambers are in communication.

* * * * *